United States Patent [19]
Dunne

[11] Patent Number: 5,669,962
[45] Date of Patent: Sep. 23, 1997

[54] RAPID THERMAL SWING DRYER FOR COMPRESSED GASES

[75] Inventor: Stephen R. Dunne, Algonquin, Ill.

[73] Assignee: UOP, Des Plaines, Ill.

[21] Appl. No.: 616,867

[22] Filed: Mar. 15, 1996

[51] Int. Cl.$^6$ .................. B01D 53/04; B01D 53/26
[52] U.S. Cl. .................. 95/115; 95/125; 95/126; 96/146; 96/154
[58] Field of Search .................. 95/106, 114, 115, 95/117, 120, 123–126; 96/146, 154

[56] References Cited

U.S. PATENT DOCUMENTS

| | | | |
|---|---|---|---|
| 1,948,779 | 2/1934 | Abbott et al. | 95/120 |
| 2,071,868 | 2/1937 | Von Lüde | 95/126 |
| 2,233,189 | 2/1941 | Altenkirch | 95/115 X |
| 2,580,404 | 1/1952 | Bush | 95/106 |
| 3,296,773 | 1/1967 | Hemstreet | 95/114 |
| 3,430,418 | 3/1969 | Wagner | 55/25 |
| 3,568,406 | 3/1971 | Dynes | 95/115 |
| 3,683,591 | 8/1972 | Glav | 95/126 X |
| 3,986,849 | 10/1976 | Fuderer et al. | 55/25 |
| 4,484,933 | 11/1984 | Cohen | 55/25 |
| 4,696,681 | 9/1987 | Lloyd-Williams | 95/115 |
| 5,230,719 | 7/1993 | Berner et al. | 95/123 X |
| 5,268,022 | 12/1993 | Garrett et al. | 95/98 |
| 5,271,762 | 12/1993 | Schoofs et al. | 95/115 X |
| 5,453,112 | 9/1995 | Sinicropi et al. | 95/106 X |
| 5,456,093 | 10/1995 | Dunne et al. | 62/480 |
| 5,512,083 | 4/1996 | Dunne | 95/115 X |

FOREIGN PATENT DOCUMENTS

| | | | |
|---|---|---|---|
| 3226502A1 | 3/1983 | Germany . | |
| 63-107725 | 5/1988 | Japan | 95/125 |
| 01-099629 | 4/1989 | Japan | 95/117 |

OTHER PUBLICATIONS

Lukchis, George M., "Adsorption Systems: Part II," *Chemical Engineering Magazine*, Jul. 9, 1993, p. 83.

*Primary Examiner*—Robert Spitzer
*Attorney, Agent, or Firm*—Thomas K. McBride; John G. Tolomei; Richard P. Silverman

[57] ABSTRACT

A cyclic process is provided for drying a compressed gas using at least two shell and tube adsorber heat exchangers each having a shell-side passage and a tube-side passage wherein the tubes have an interior surface which is uniformly coated with a solid adsorbent. In the operation of the process, a feed gas at ambient conditions is passed to the shell-side passage of the first adsorber to cool the adsorber and heat the feed gas stream to provide a first exchanged stream. The first exchanged stream is compressed and passed to the shell-side passage of another adsorber heat exchanger to provide a second exchanged stream. The second exchanged stream is returned to the tube-side passage of the first adsorber heat exchanger wherein the second exchanged stream is contacted with the adsorbent to adsorb moisture and thereby produce a dry compressed gas stream. A portion of the dry compressed gas stream is employed to purge the tube-side passage of other adsorber heat exchangers. The position of the first and other adsorber heat exchanger is interchanged in a cyclic process to produce the dry compressed gas. The interchanging of the adsorber heat exchangers is cycled rapidly to provide dry compressed gas for truck or locomotive brake systems and shop air supplies which have significantly lower adsorbent mass requirements and use significantly less purge gas than conventional pressure swing adsorption dryers.

13 Claims, 1 Drawing Sheet

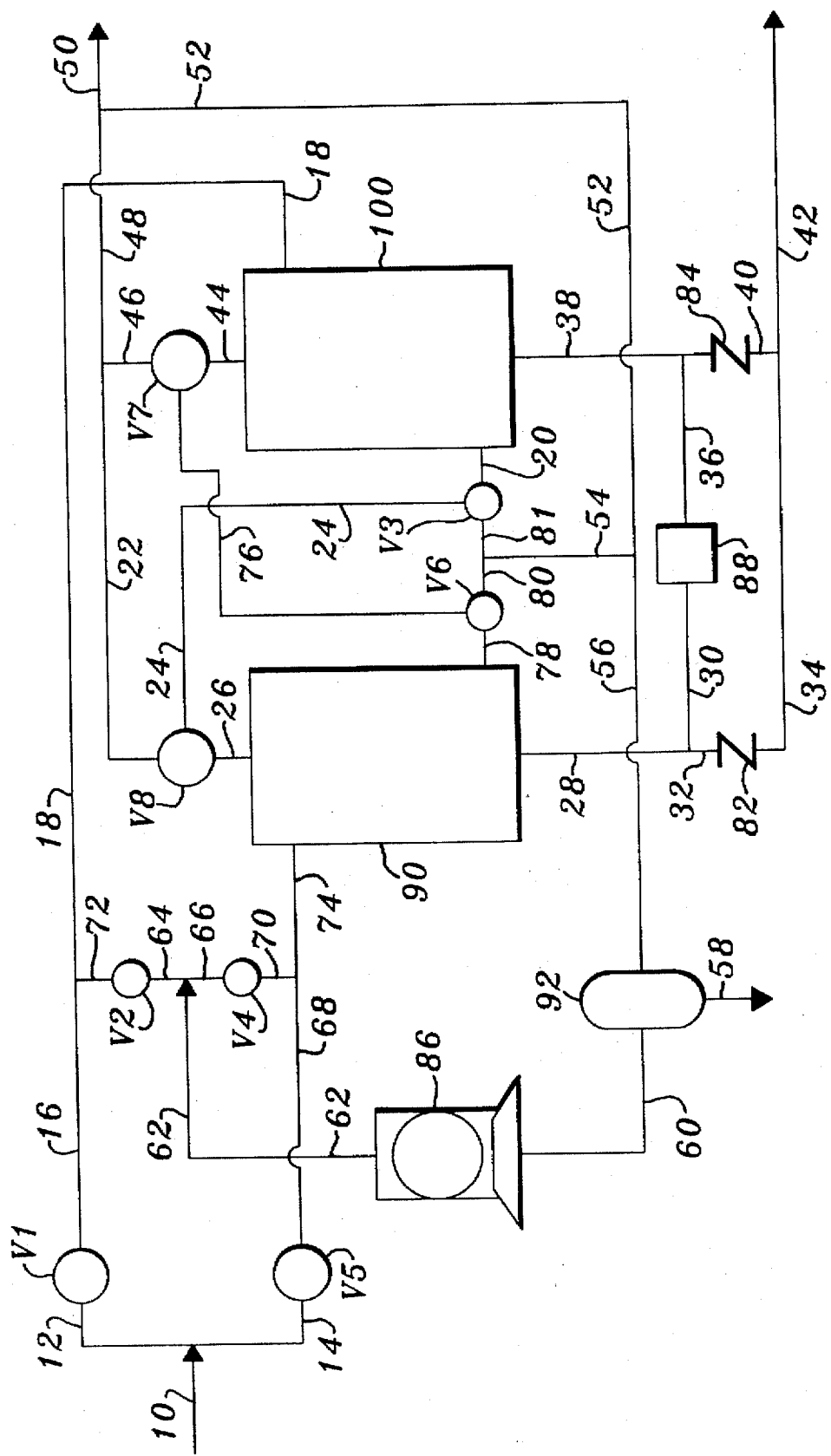

RAPID THERMAL SWING DRYER FOR COMPRESSED GASES

FIELD OF THE INVENTION

The present invention relates, in general, to a process for drying a compressed gas stream and, more particularly, to a process for drying a gas stream with a solid adsorbent and thermal swing adsorption.

BACKGROUND OF THE INVENTION

Drying of gases to remove water is a common requirement in providing gases at high pressure for use in chemical processing, air brake systems in transportation, and shop applications ranging from pneumatic control to paint spraying. The removal of moisture from the high pressure gases reduces corrosion and prevents water buildup in such systems. Condensation of water in air brake systems or pneumatic systems can result in inefficiencies and system failure.

Generally, commercial adsorbers comprise fixed beds which are filled with adsorbent particles with the fluid passing up through or down through the beds. Commercial experience shows that either flow direction maybe satisfactory. An article entitled "Adsorption Systems: Part II—Equipment Design," by George M. Lukchis, which appeared in CHEMICAL ENGINEERING MAGAZINE, Jul. 9, 1993, page 83, states that as a role, flow through adsorber beds should not be in a horizontal direction to avoid flow channeling or by-passing of the fluid around portions of the bed. Such channeling or by-passing would serve to reduce the capacity of the adsorbent bed.

In fluid drying and purification applications in which a contaminant is present in the fluid at concentrations of about 3% or less, the adsorbent is generally of low value and frequently removed for disposal. One important drying and purification application includes drying air, particularly compressed air. In such applications cost can become a significant factor in the selection of a drying process. For example, a once-through process employs an adsorbent which is exposed to the fluid until the adsorbent is no longer effective in removing the contaminant. Once-through processes require large inventories of adsorbent and frequent disposal of spent adsorbent. An alternative to this approach is to employ a regenerative adsorption cycle wherein the adsorbent is periodically regenerated to remove the contaminant from the spent adsorbent and restore the adsorbent's capacity for adsorbing the contaminant. Regenerative adsorption cycles are generally classified according to the manner in which the desorption takes place. Both thermal swing adsorption processes and pressure swing adsorption processes are generally known in the art for various types of adsorptive separations. Generally, thermal swing processes utilize the process steps of adsorption at a low temperature, regeneration at an elevated temperature with a hot purge gas and subsequent cooling down to the adsorption temperature. One process for drying gases generally exemplary of thermal swing processes is described in U.S. Pat. No. 4,484,933, issued to Cohen. The patent describes basic thermal swing processing steps coupled with the use of an auxiliary adsorber bed for improving the regeneration step. Thermal swing processes are often used for drying gases and liquids and for purification where trace impurities are to be removed. Often, thermal swing processes are employed when the components to be adsorbed are strongly adsorbed on the adsorbent, i.e., water, and thus, heat is required for regeneration. Thermal swing adsorption processes are characterized by long cycles which require large amounts of purge gas to regenerate and cool the adsorbent to return the adsorbent to adsorption conditions in each cycle.

Pressure swing adsorption (PSA) provides a means for adsorption that does not require heat for regeneration. Instead, regeneration is accomplished by reducing the pressure in the adsorber bed to below the pressure at which adsorption had occurred. PSA process typically includes steps of adsorption at an elevated pressure, desorption to a lower pressure and repressurization to the adsorption pressure. The process also often includes a purge step at the desorption pressure to enhance desorption. PSA processes are characterized by lower adsorbent loadings within each cycle which results in greater inventories of adsorbent. Furthermore the cycle time of a PSA process is shorter than a thermal swing adsorption process because there are no heat transfer related delays while the bed is cooled to adsorption conditions. Lastly, the amount of purge gas required for a PSA process can be significantly lower than the amount of purge gas in a thermal swing adsorption process, because the purge gas in the PSA process is only required to remove adsorbate from the adsorbent and not to additionally cool the adsorbent.

Such PSA processing is disclosed in U.S. Pat. No. 3,430,418 issued to Wagner and in U.S. Pat. No. 3,986,849 issued to Fuderer et al., wherein cycles based on the use of multi-bed systems are described in detail. As is generally known and described in these patents, the contents of which are incorporated herein by reference as if set out in full, the PSA process is generally carried out in a sequential processing cycle that includes each bed of the PSA system. Such cycles are commonly based on the release of void space gas from the product end of each bed in one or more cocurrent depressurization steps upon completion of the adsorption step. In these cycles, the released gas typically is employed for pressure equalization and for subsequent purge steps. The bed is thereafter countercurrently depressurized and often purged to desorb the more selectively adsorbed component of the gas mixture from the adsorbent and to remove such gas from the feed end of the bed prior to the repressurization thereof to the adsorption pressure.

U.S. Pat. No. 5,456,093 to Dunne et al. which is hereby incorporated by reference discloses a desiccant cooling apparatus and process employing a solid adsorbent and refrigerant wherein the adsorbent is bonded to the heat exchange tubes within the device. The solid adsorbent is selected from the group consisting of zeolite Y-85, a low cerium rare earth exchanged Y-84, and a rare earth exchanged LZ-210. The refrigerant is contained within the adsorbent lined tubes. U.S. Pat. No. 5,456,093 further discloses a slip-coating method whereby the adsorbent is bonded directly to the inside surface of the heat exchanger tubes.

U.S. Pat. No. 5,268,022 to Garrett et al. discloses a pressure swing adsorption plant comprising at least one pressure vessel containing an adsorbent wherein a heat conductive member containing a liquid medium is arranged within the vessel to conduct heat by convection from a region of maximum temperature at the bottom of the vessel to a region of minimum temperature near the top of the vessel.

German reference DE 3226502-a, published on Feb. 3, 1983, discloses a process wherein a stream of moist gas flows over a serpentine or other coiled tube which has been coated with an agent such as a salt to adsorb moisture. The agent is continuously or intermittently regenerated by heating the interior of the coil.

Processes are sought to provide a more compact and a more efficient process for producing dry, compressed gases which combine the low adsorbent loading advantages of thermal swing adsorption with the reduced purge gas requirements of pressure swing adsorption. It is also an objective of the present invention to find a process which can be carried out without the limitations of bed pressure drop and physical orientation common to fixed bed adsorption processes.

SUMMARY OF THE INVENTION

The present invention provides a process for drying gases such as air, light hydrocarbons, nitrogen, hydrogen, and mixtures thereof. Rather than a conventional lured bed of solid adsorbent, the present invention employs a shell and tube exchanger wherein the solid adsorbent is disposed uniformly, or is uniformly lined, on the interior surface of the tube-side passages of the exchanger to provide an adsorber heat exchanger. As a result, the adsorbent lined tubes provide improved adsorption properties and performance in any orientation, requiring less adsorbent, and requiring a reduced amount of purge gas over conventional pressure swing adsorption processes. In fact in the process of the present invention, all of the feed gas is used to heat and cool the adsorbent and only a small fraction of the product gas is used to purge the adsorbent. Combined with a rapid thermal swing cycle, the adsorber heat exchanger of the present invention can be employed to provide improved systems for drying compressed gases, for such applications as air brake drying in truck and locomotive brake systems, and in providing dry compressed gases for shop use.

The present invention relates to a cyclic process for drying a compressed gas stream. The process comprises passing a feed gas stream comprising moisture at ambient conditions to a shell-side passage of a tint adsorber heat exchanger of at least two adsorber heat exchangers to provide a first exchanged stream comprising moisture. Each of the adsorber heat exchangers comprises a shell-side passage and a tube-side passage wherein the tube-side passage comprises at least one tube having an outside tube surface within the shell-side passage and a hollow interior surface and an adsorbent disposed on the interior surface within the tube-side passage. The first exchanged stream is passed to a compressor to raise the first exchanged stream to a delivery pressure and temperature and to provide a pressurized stream. The pressurized stream is passed to the shell-side passage of another adsorber heat exchanger to exchange heat with the tube side passage, to deposit a portion of the moisture on the outside tube surface within the shell-side passage of the other adsorber heat exchanger, and to provide a second exchanged stream. The second exchanged stream is passed to the tube-side passage of the tint adsorber heat exchanger and therein the second exchanged stream is contacted with the adsorbent to adsorb moisture from the second exchanged stream and to provide a dry compressed gas stream. At least a portion of the dry compressed gas stream is passed to the tube-side passage of the tube-side passage of the other adsorber heat exchanger to purge the adsorbent and produce a waste stream. The above steps are periodically repeated to provide a cyclic process.

BRIEF DESCRIPTION OF THE DRAWINGS

The drawing is a schematic flow diagram illustrating the process of the present invention.

DETAILED DESCRIPTION OF THE INVENTION

The process of the invention is intended to be practiced on feed gas streams which comprise moisture or water; such feed gas streams include air, nitrogen, light hydrocarbons and mixtures thereof. The term "light hydrocarbons" is intended to include hydrocarbons having 1 to 4 carbon atoms per molecule.

The process of the present invention is useful in gas drying applications such as in air brake systems for trucks or locomotives. In these systems the gas, such as air, is saturated with water following its compression to some operating pressure to activate the braking systems of the vehicle of piece of heavy equipment. If this water is not removed or significantly reduced, the braking systems will be subject to greater corrosion, higher maintenance costs and reduced reliability. Generally, the feed gas stream employed to activate a braking system comprises air at water saturation conditions and a pressure above atmospheric pressure. Preferably the temperature at which the feed gas stream is available ranges between about 37° C. (100° F.) and about 82° C. (180° F.). More preferably the temperature at which the feed gas stream is available ranges between about 37° C. (100° F.) and about 66° C. (150° F.). Preferably the pressure at which the feed stream is available is greater than about 790 kPa (100 psig), and more preferably the pressure at which the feed gas stream is available ranges between about 790 kPa and about 1.14 MPa (150 psig), and most preferably the pressure at which the feed gas stream is available ranges between about 790 kPa and about 869 kPa (110 psig).

The water in the feed gas stream will be present at saturated conditions which comprise from about 8,000 to about 32,000 ppm-vol depending upon the temperature and the pressure of the feed gas. Preferably the water content in the product gas, or dry compressed gas, produced by the dryer will be reduced by at least about 95 percent, and more preferably the water content in the product gas will be reduced by about 95 to about 99.9 volume percent of the amount of water in the feed gas. Preferably the amount of water in the product gas stream will be less than 1000 ppm-vol, and more preferably the amount of water in the product gas stream will range from about 50 to about 100 ppm-vol. In some cases the water content of the product gas will expressed as the dew point depression from the ambient air temperature, wherein the dew point depression is the ambient temperature minus the dew point temperature for any stream. The dew point temperature for any stream is the temperature at which condensation will occur. In such cases, the dew point depression preferably will be greater than about 17° C. (30° F.) and more preferably will be greater than about 50° C. (90° F.).

The term pressure swing adsorption as used herein generally relates to an adsorption process wherein an adsorber bed is part of an integrated process whereby a continuous adsorber operation can be obtained while simultaneously regenerating a spent another bed. In pressure swing adsorption these exists a plurality of adsorption zones maintained at an elevated pressure effective to adsorb water while allowing the bulk of the feed gas to pass through the adsorber bed. At a defined time, the passing of the adsorber feed to one another is discontinued and the adsorber bed is depressurized by one or more counter-current depressurization steps wherein the pressure is reduced to a defined level which permits additional components of the feed gas remaining in the another bed to be withdrawn and utilized. The adsorber bed is depressurized by a countercurrent depressurization step wherein the pressure in the adsorber bed is further reduced by withdrawing desorbed water vapor countercurrently to the direction of the feed. Finally the adsorber bed is purged with a purge gas such as dried product gas and repressurized. The final stage of repressurization is with the feed gas or the product gas in order to conserve the feed or the product gas.

In air brake drying systems the process is a little more simple and generally there are no feed gas conservation steps. Pressure swing adsorption in air brake drying is generally carried out in a single adsorbent bed with essentially two process steps. The adsorption stroke comprises rising pressure adsorption as the feed gas is introduced and the adsorber bed pressure rises to the pressure of the feed gas, followed by constant pressure adsorption as the feed gas is passed through the adsorber bed. The adsorption stroke is continued until a pressure differential between the effluent or product gas pressure and the feed gas pressure is reached. Typically this pressure differential is reached after about 2 minutes in light service, or in about 30 seconds under heavy duty. At this point, the feed gas passing is discontinued and the adsorber bed is placed in a desorption stroke wherein the adsorber bed is simultaneously counter-currently depressurized and purged with a portion of the product gas. Typically the portion of the product gas is collected during each cycle in a reservoir, or pressurized storage tank. At the completion of the desorption stroke, the pressure swing air dryer is returned to the adsorption stroke. A cycle time for pressure swing air brake drying means the length of time of the adsorption stroke plus the length of the desorption stroke. Typically the cycle times for such pressure swing air brake dryers ranges from about 60 seconds to about 150 seconds. The pressure swing air brake dryers are fixed beds containing an adsorbent and are configured with low length to diameter ratios to accommodate vehicle space limitations. In some severe service situations for example in locomotives, pressure swing adsorption air brake systems are provided with 2 adsorption beds which alternate between the adsorption and desorption strokes to provide a continuous supply of dry air.

Pressure swing adsorption systems are more efficient at higher pressures, typically pressures greater than about 2.2 MPa (300 psig). In addition, pressure swing adsorption air brake dryers are generally characterized by short cycles with relatively low differences in adsorbent loading between the upper and lower pressure ranges of operation. This leads to the use of larger amounts of adsorbent in a pressure swing adsorption device than a thermal swing adsorption process. Furthermore, the amount of purge gas required for a pressure swing adsorption unit varies inversely with pressure; the ratio of purge gas to feed gas is reduce as the pressure increases. At low pressures, the amount of purge gas approaches the amount of feed gas. The advantage of the present invention is that the present invention provides an efficient drying process for delivery pressures less than 2.2 MPa (300 psig). The present invention has the advantage of a lower compression cost and uses less purge gas than pressure swing air brake drying.

Thermal swing adsorption comprises the use of at least two adsorption bed wherein the feed gas is passed to one of the adsorption beds containing a water selective adsorbent and a dry product gas is produced. At a point when the moisture content of the product gas reaches a maximum tolerable level, or a point prior to breakthrough of the water into the product gas, the passing of the feed gas is switched to another adsorber bed and the first adsorber bed is regenerated by passing a heated purge gas through the water laden adsorber bed. The heated purge gas may be passed in a direction that is either co-current or counter current to the direction of the feed gas passing to regenerate the adsorbent. After a specified time, the passing of the heated purge gas is discontinued and an unheated purge gas is passed through the regenerated bed to cool the bed to the adsorption conditions and the cycle is repeated. The use of two or more adsorber beds permits the process to operate in a continuous manner. In thermal swing adsorption devices, the differential loading of water on the adsorbent between the adsorption and desorption states is larger than in pressure swing adsorption devices, but the cycle time of the thermal swing devices is significantly longer because the fixed bed configuration of the thermal swing systems requires a significant period of time for the adsorbent to cool down to the adsorption conditions. Thermal swing adsorption has limited application to air brake drying systems because the amount of purge gas required over the long regeneration cycles will equal or exceed the total amount of the feed gas available. To date it has been impractical to apply thermal swing adsorption techniques to air brake drying.

In the present invention the water selective adsorbent is applied to the inside surface of a heat exchange device such as the inside tube surface of a shell-and-tube exchanger or an equivalent inside surface of a flat plate exchanger. It is believed that by the application of the selective adsorbent in very thin layers to the inside surfaces of the heat exchangers, that the resistance to the heat exchange process during regeneration can be significantly reduced over the heat exchange that takes place over fixed beds of adsorbent in conventional thermal swing adsorption processes. It is preferable that the adsorbent be applied uniformly to the interior surface of the tubes, although portions of the interior tube surface may have non-uniform and uneven layers of adsorbents to facilitate condensation of vaporization on the outside surface of the tubes. Furthermore, the use of rapid thermal swing cycles permits the devices employing the present invention to achieve the water loading advantages of the thermal swing devices which are reduced size, reduced adsorbent quantities, and a cycle time normally considered within the range of pressure swing adsorption cycle times.

The process of the present invention can be carried out using any suitable adsorbent material in the first and second adsorption zones having the desired selectivity for the water vapor in the feed gas stream. Suitable adsorbents known in the art and commercially available include crystalline molecular sieves, activated carbons, activated clays, silica gels, activated aluminas and the like. The molecular sieves include, for example, the various forms of silicoaluminophosphates and aluminophosphates disclosed in U.S. Pat. Nos. 4,440,871 and 4,310,440, hereby incorporated by reference as well as zeolitic molecular sieves.

Zeolitic molecular sieves in the calcined form may be represented by the general formula:

$$Me_{2/n}O:Al_2O_3:xSiO_2:yH_2O$$

where Me is a cation, x has a value of from about 2 to infinity, n is the cation valence and y has a value of from about 2 to 10.

Typically, well-known zeolites which may be used as the adsorbent in the present invention include, chabazite, also referred to as Zeolite D, clinoptilolite, erionite, faujasite, also referred to as Zeolite X and Zeolite Y, ferrierite, mordenite, Zeolite A, and Zeolite P. Other zeolites suitable for use according to the present invention are those having a high silica content, i.e., those having silica to alumina ratios greater than 10 and typically greater than 100. One such high silica zeolite is silicalite, as the term used herein includes both the silicapolymorph disclosed in U.S. Pat. No. 4,061,724 and also the F-silicalite disclosed in U.S. Pat. No. 4,073,865, hereby incorporated by reference. (See page 9, lines 3-15 in reference.) Preferably the adsorbent employed in the present invention are selected from the group consisting of zeolite A, zeolite X, zeolite Y and mixtures thereof. More preferably the adsorbent of the present invention is selected from the group consisting of zeolite 3A, zeolite 4A, zeolite 13X, and mixtures thereof. Detailed descriptions of source of the above identified zeolites may be found in D. W. Breck, *ZEOLITE MOLECULAR SIEVES*, John Wiley and Sons, New York, 1974, hereby incorporated by reference. The patents referred to in the Background of the Invention contain further information concerning the various known adsorbents used for thermal swing and PSA operations and suitable for use in the practice of the invention.

It is often desirable when using crystalline molecular sieves that the molecular sieve be agglomerated with a binder in order to ensure that the adsorbent will have suitable physical properties. Although there are a variety of synthetic and naturally occurring binder materials available such as metal oxides, clays, silicas, aluminas, silica-aluminas, silica-zirconias, silica-thorias, silica-berylias, silica-titanias, silica-alumina-thofias, silica-alumina-zirconias, mixtures these and the like, clay-type binders are preferred. Examples of clay which may be employed to agglomerate the molecular sieve without substantially altering the adsorptive properties of the zeolite are attapulgite, kaolin, volclay, sepiolite, silica, palygorskite, kaolinite, bentonite, montmorillonite, illite and chlorite. The choice of a suitable binder and methods employed to agglomerate the molecular sieves are generally known to those skilled in the art and need not be further described herein.

DETAILED DESCRIPTION OF THE DRAWINGS

In the drawing, the process of the present invention is illustrated by means of a simplified flow diagram in which such details as pumps, instrumentation, heat-exchange, heat recovery circuits, compressors, check valves, and similar hardware have been deleted as being non-essential to an understanding of the techniques involved. The use of such miscellaneous equipment is well with in the purview of one skilled in the art.

With reference now to the drawing, a feed gas stream available at ambient conditions of temperature and pressure is introduced to the process via conduit 10. The feed gas comprising moisture proceeds via line 12, valve V1, and lines 16 and 18 to the shell-side passage of adsorber heat exchanger 100. The adsorber heat exchanger 100 is a shell and tube heat exchanger comprising a shell-side passage and a tube-side passage. The tube-side passage consists of at least 1 tube having an outside surface and a hollow interior surface with an adsorbent uniformly disposed on the hollow interior surface of the tube. The feed gas stream enters the shell-side passage of the adsorber heat exchanger 100 and passes over the outside tube surface whereby the feed gas stream is heat exchanged as it cools the outside of the adsorbent-lined tubes and picks up moisture on the outside surface of the tubes from a previous cycle to provide a first exchanged stream which is removed from the shell-side passage in line 20. The primary purpose of passing the feed gas at ambient conditions over the tubes is to cool the adsorbent and to increase the moisture content of the air or gas passing through the shell-side of the adsorbent heat exchanger. The first exchanged stream continues through valve V3 and lines 81, 54, and 56 to a water removal zone 92. The water removal zone 92 can be a conventional knockout pot or any other such device for removing water droplets which are then withdrawn from the system via line 58. A water reduced stream from the water removal zone is passed via line 60 to compressor 86. Compressor 86 raises the pressure of the water reduced stream 60 to a delivery pressure preferably less than about 6.9 MPa (1000 psig), and more preferably the compressor raises the delivery pressure of the water reduced stream to a pressure of between about 450 kPa (50 psig) and about 1.5 MPa (200 psig), and most preferably the compressor raises the delivery pressure of the water reduced stream 60 to a pressure between about 450 kPa (50 psig) and about 1.14 MPa (150 psig) to provide a pressurized stream 62. The temperature of the pressurized stream 62 ranges from about 50° C. to about 120° C. Preferably the temperature of the pressurized stream 62 will be at a temperature ranging from about 65° C. (150° F.) to about 110° C. (230° F.), and more preferably the temperature of the pressurized stream will range from about 65° C. (150° F.) to about 80° C. (175° F.). The pressurized stream 62 is withdrawn from the compressor 86 and passed to line 66, valve V4, line 70, and line 74 to the shell-side passage of another adsorber heat exchanger 90 to exchange heat with the tube-side passage of adsorber heat exchanger 90, depositing a portion of the moisture on the outside surface of the tubes and heating the tubes of adsorber heat exchanger 90 to provide a second exchanged stream in line 78 at a temperature near its dew point. It is preferable to minimize the length of the path between the compressor and the other heat exchanger via lines 66, valve V4, line 70 and line 74, or insulate this path in order to deliver the pressurized stream 62 to the other heat exchanger 90 at the maximum temperature of the system. The second exchanged stream line 78 is passed through valve V6, line 76, valve V7, and line 44 to the tube-side passage of adsorber heat exchanger 100. In adsorber heat exchanger 100, the second exchanged stream on the tube-side passage is contacted with an adsorbent to adsorb moisture on the tube-side passage to produce a dry compressed gas stream which is withdrawn in line 38. The dry compressed gas stream at a pressure essentially equal to the delivery pressure is passed from line 38 to check valve 84, line 40, and 42, to be delivered as the dry compressed gas product 42. A portion of the dry compressed gas stream in line 38 may be passed through line 36 to pressure reduction device 88 which may be an orifice or some other device like a valve to reduce the pressure of the dry compressed gas stream 38 and provide a purge stream in line 30. The purge stream 30 is passed via line 30 and line 28 to the tube-side passage of the other another heat exchanger 90 to purge the adsorbent in the tube-side passage and produce a waste stream which is removed from the tube-side passage via lines 26, valve V8, line 22, line 48, and line 50. A portion of the waste stream 48 may be returned to the system for conservation of the gas via lines 52 and 56, by passing the portion of the waste stream 56 to the water removal zone 92 to be admixed with the first exchanged stream. This completes one half of the cycle. The cycle is periodically reversed by interchanging the functions of the adsorber heat exchanger 100 with that of adsorber heat exchanger 90 and the steps are repeated to produce a continuous flow of dry compressed gas product 42. In this reversed, or altered mode, the feed gas stream is introduced via line 10 and passes through line 14, valve V5, line 68 and line 74, to the shell-side passage of adsorber heat exchanger 90 to exchange heat with the tube side of the adsorber exchanger 90, thereby cooling the tube side of the adsorber exchanger 90 and picking up moisture deposited in a previous cycle from the surface of the tubes to provide a first exchanged stream 78. The first exchanged stream is withdrawn in line 78 and passed through valve V6, line 80, line 54 and line 56 to water removal zone 92. Any water removed in the water removal zone 92 is removed via line 58 and the first exchanged stream continues via line 60 to compressor 86. The pressurized stream 62 is removed from the compressor 86 and passed via line 64, valve V2, line 72, and line 18 to the shell-side passage of adsorber heat exchanger 100 to thereby exchange heat with the tube-side passage of adsorber heat exchanger 100 thereby giving up some heat and moisture which is deposited on the outside surface of the tubes and to provide a second exchanged stream 20 which is withdrawn from the shell-side passage of adsorber heat exchanger 100. The second exchanged stream 20 is passed through valve V3 to line 24, valve V8, and line 26 to the tube-side passage of adsorber heat exchanger 90 and therein the second heated stream is contacted with the adsorbent to adsorb moisture therefrom to provide a dry compressed gas stream which is withdrawn from the tube-side passage of adsorber heat exchanger 90 in line 28. The dry compressed gas stream continues from line 28 through line 32, check valve 82, 30, line 34, and line 42 to provide a dry compressed gas product. A portion of the dry compressed gas stream 28 may be passed through line 30 to pressure reduction zone 88 to provide the purge gas at ambient pressure for the first part of the cycle. The purge gas stream is passed from zone 88 through the tube side of adsorber heat exchanger 100 via line 36 and 38 to provide the waste stream in line 44 which is removed via valve V7, line 46, line 48, and line 50.

The compressed gas product can be efficiently produced when the cycling or the interchanging of the operation of the adsorber heat exchangers is switched after a period of time ranging from about 30 seconds to about 3 minutes. This rapid cycling of the function of the absorber heat exchangers provides a very efficient process for drying gases such as air, nitrogen, light hydrocarbons, and hydrogen by significantly reducing the amount of adsorbent required compared to a PSA, pressure swing adsorption, process which requires significantly more adsorbent and requires a significant amount of material as purge gas or waste gas to desorb the moisture from the adsorbent. In the process of the invention, the number of adsorber heat exchangers comprises from about 2 to 10 adsorber heat exchangers. Furthermore, the orientation of the adsorber heat exchangers of the present invention are not restricted to the vertical flow of fluids through the tube-side passages. The tube-side passages may take on any orientation from vertical to horizontal and may be arranged in coils, spokes, or fan-like arrays at any angle with the vertical axis. In addition, the tubes may be configured in any shape with a variety of cross-sections including round, oval, square, and quadrilateral with opposite sides parallel to each other. The tubes may include devices to extend the outside heat transfer surface well-known in the an such as fins, spikes, plates and other such surface extenders to provide enhanced heat transfer between the outside tube surface and the fluid stream on the shell-side passage. The result is an overall more inexpensive process with a significantly reduced operating cost since the gas which is dried to provide the purge gas is a much smaller quantity in the present invention than would be required by a fixed bed pressure swing adsorption process. This reduces both the compressor operating requirements and the compressor capital costs which significantly reduces the capital costs of the overall system. When the process is used to dry air, the return of the waste gas to the water removal zone via line 52 is generally not required.

EXAMPLES

The following examples are provided to illustrate the process of the present invention and are not intended to limit the scope of claims that follow. The examples are based on laboratory data of adsorption characteristics of various desiccants or on process engineering design calculations and adsorption relationships as noted.

Example I

A typical PSA air brake dryer of the prior an containing a single adsorbent bed for an air brake system on a truck or locomotive reduces the water content of a water saturated air stream. The compressed air stream to be dried is generally water saturated and is available at a temperature of about 65° C. (150° F.) and a pressure of about 930 kPa (135 psia). The dry air stream to be produced will have a −16° C. (4° F.) dew point or a condition wherein the partial pressure of water in the dry air stream is 0.156 kPa (0.0227 psia). A conventional pressure swing adsorption (PSA) dryer for this application is typically regenerated with a portion of the product gas. In Table 1 at column A there is a summary of the parameters of the PSA air brake dryer for feed rate of compressed air of about 12.7 standard cubic meters per hour (7.5 SCFM). The water loading for the PSA dryer is about 4 grams per cycle (0.009 pounds per cycle) and the adsorbent is a zeolite adsorbent such as zeolite 4A, 3A, or 13X. Often the water saturated stream is a compressed air stream and trace amounts of compressor oil are present. In such cases, zeolite 4A adsorbent is preferred. The amount of adsorbent required to achieve a dry air specification which corresponds to a 99+% water removal is 1.59 kilograms (3.5 pounds). In a PSA adsorption/desorption cycle of 120 seconds, the effective water removal rate of the PSA dryer is about 0.122 kilograms/hour (0.27 pounds/hour). The delta loading, or the amount of water picked up by the adsorbent per cycle is relatively small requiring a large amount of adsorbent and a correspondingly large capital cost for the PSA dryer.

Example II

In Example II the required operation of a prior art fixed bed thermal swing dryer are calculated to treat a compressed air feedstream at the same rate and conditions of Example I. The calculations are based on a single fixed bed of adsorbent containing about 29 grams of zeolite adsorbent. The cycle time required to operate such a thermal swing dryer is about 1800 seconds. The fixed bed thermal swing dryer is periodically regenerated with dry product gas at a temperature of about 93° C. (200° F.). The effective water removal rate of the thermal swing dryer is about 0.0082 kilograms/hour (0.018 pounds/hour). The parameters of the thermal swing dryer are shown in Table I in column B. The thermal swing dryer overcomes the low delta loading of the PSA dryer, but the very long cycle time (15 times longer than the PSA dryer) which is the result of the inherently poor heat transfer properties of the zeolite molecular sieve beads in the fixed bed thermal swing dryer is a major disadvantage. At this cycle time, the fixed bed thermal dryer requires so much more purge gas to regenerate and cool the fixed bed that the purge exceeds the feed amount. Both the long cycle times and the excessive amount of purge gas required make thermal swing air brake dryers impractical.

Example III

The air brake dryer of Example I is replaced with a rapid thermal swing dryer of the present invention as shown in FIG. 1 and described herein to treat an air stream of the same feed rate of Example I. As shown in Table 1, column C, the dryer contains about 41 gram. (0.09 pounds) of zeolitic adsorbent disposed on the inside walls of the dryer tubes.

The dryer is regenerated with a portion of the heated dry product gas at a temperature of about 93° C. (200° F.). The cycle time of the rapid thermal swing dryer is about 120 seconds, or about the same as the PSA dryer of Example I. The effective water removal rate of the rapid thermal swing dryer is about 0.122 kilograms per hour, or the same as the PSA dryer of Example I.

Example IV

A comparison of the Examples I, II, and III shows that the rapid thermal swing dryer of the present invention provides the same effective water removal rate of the PSA dryer with a significantly reduced amount of adsorbent. The rapid pressure swing adsorbent dryer required only about 3 percent of the amount of adsorbent of the PSA dryer. Furthermore, the increased heat transfer efficiency of the rapid thermal swing dryer permitted a 15 fold reduction in the cycle time over the hypothetical thermal swing dryer which used a fixed bed of adsorbent. In all of the cases studied the purge gas is used to carry off the moisture removed from the compressed air. In the fixed bed, thermal swing process of Example II, significantly more purge gas is required to heat the adsorbent to the regeneration temperature and to cool the adsorbent after the regeneration, an amount significantly greater than the amount of feed gas available. The relative amount of purge gas required in Example I, the PSA dryer, is about 10.9 volume percent of the feed gas, and the relative amount of purge gas for the rapid thermal swing adsorption process of Example III is 0.48 percent, or about less than 5 percent of the purge required for the PSA dryer. In addition, all of the feed gas is employed in Example III to both heat and cool the adsorbent between adsorption strokes.

TABLE 1

PERFORMANCE OF AIR BRAKE DRYER SYSTEMS

| Parameter: | Case A | Case B | Case C |
|---|---|---|---|
| Water Load, grams/cycle | 4 | 4 | 4 |
| Cycle Time, seconds | 120 | 1800 | 120 |
| Bed Size, grams | 1587 | 29 | 41 |
| Effective Water Removal Rate, grams/hour | 0.122 | 0.0082 | 0.122 |
| Purge Required, percent of Feed | 10.9 | >Feed Rate | 0.48 |
| Delta Loading, wt H$_2$O/wt adsorbent | .00288 | 0.14 | 0.10 |

I claim:

1. A cyclic process for drying a compressed gas stream comprising:
    a) passing a feed gas stream comprising moisture at ambient conditions to a shell side passage of a first adsorber heat exchanger of at least two adsorber heat exchangers each of said adsorber heat exchangers comprising a shell-side passage and a tube-side passage wherein the tube-side passage comprises at least one tube having an outside tube surface within the shell-side passage and a hollow interior surface and an adsorbent disposed on said hollow interior surface within the tube-side passage to provide a first exchanged stream comprising moisture;
    b) passing said first exchanged stream to a compressor to raise the first exchanged stream to a delivery pressure and a delivery temperature and to provide a pressurized stream and passing the pressurized stream to the shell-side passage of another adsorber heat exchanger of the at least two adsorber heat exchangers to exchange heat with the tube-side passage, to deposit a portion of the moisture on the outside tube surface within the shell-side passage, and to provide a second exchanged stream;
    c) passing said second exchanged stream to the tube-side passage of the first adsorber heat exchanger and therein contacting said second exchanged stream with the adsorbent to adsorb moisture from said second exchanged stream and to produce a dry compressed gas stream;
    d) passing at least a portion of said dry compressed gas stream to the tube-side passage of the other adsorber heat exchanger to purge said adsorbent and produce a waste stream; and
    e) periodically interchanging the first adsorber heat exchanger with the other adsorber heat exchanger and repeating steps (a) through (d) to provide said cyclic process.

2. The process of claim 1 wherein step (e) is periodically interchanged after a period of time ranging from about 30 seconds to about 3 minutes.

3. The process of claim 1 wherein said adsorbent is selected from the group consisting of Zeolite X, Zeolite Y, Zeolite A, and mixtures thereof.

4. The process of claim 1 wherein the delivery pressure comprises less than about 2.2 MPa (300 psig).

5. The process of claim 1 wherein said delivery temperature ranges between about 50° C. to and about 120° C.

6. The process of claim 1 wherein said delivery pressure to which the first exchanged stream is raised ranges from about 200 kPa to about 2 MPa.

7. The process of claim 1 further comprising passing said first exchanged stream to a moisture removal zone prior to passing said first exchanged stream to the compressor.

8. The process of claim 1 wherein said at least two adsorber heat exchangers comprises 2 absorber heat exchangers.

9. The process of claim 1 wherein said at least two adsorber heat exchangers comprises from about 2 to about 10 adsorber heat exchangers.

10. The process of claim 1 wherein said feed gas stream is selected from the group consisting of air, light hydrocarbons, nitrogen, hydrogen, and mixtures thereof.

11. The process of claim 1 wherein said adsorbent is selected from the group consisting of Zeolite 4A, Zeolite 3A, Zeolite 13X, and mixtures thereof.

12. The process of claim 1 wherein the dry compressed gas stream comprises a dew point depression greater than about 17° C. (30° F.).

13. The process of claim 1 wherein the dry compressed gas stream comprises a dew point depression greater than about 50° C. (90° F.).

* * * * *